United States Patent [19]

Brown et al.

[11] Patent Number: 5,107,489

[45] Date of Patent: Apr. 21, 1992

[54] SWITCH AND ITS PROTOCOL FOR MAKING DYNAMIC CONNECTIONS

[76] Inventors: Paul J. Brown, 16 Carmen Dr., Poughkeepsie, N.Y. 12603; Joseph C. Elliott, 29 Larchmont Dr., Hopewell Junction, N.Y. 12533; Peter A. Franaszek, Pine Tree Dr., Katonah, N.Y. 10536; Karl H. Hoppe, R.D. 1, Box 30B, Ulster Park, N.Y. 12487; Kenneth R. Lynch, R.R. 2, Box 441, Rhinebeck, N.Y. 12572; Martin W. Sachs, 28 Warnock Dr., Westport, Conn. 06880; Leon Skarshinski, 18 Rokeby Rd., Red Hook, N.Y. 12571

[21] Appl. No.: 429,267

[22] Filed: Oct. 30, 1989

[51] Int. Cl.$^5$ .............................. H04J 3/14
[52] U.S. Cl. ...................... 370/58.2; 340/825.15; 340/825.79
[58] Field of Search ............ 370/94.1, 60, 60.1, 370/65.5, 63, 58.1, 58.2, 94.3; 340/825.79, 825.8, 825.03, 825.15

[56] References Cited

U.S. PATENT DOCUMENTS

| | | | |
|---|---|---|---|
| 4,074,142 | 2/1978 | Jackson | 250/551 |
| 4,562,533 | 12/1985 | Hodel et al. | 364/200 |
| 4,605,928 | 8/1986 | Georgiou | 340/827 |
| 4,630,045 | 12/1986 | Georgiou | 340/825.79 |
| 4,635,250 | 1/1987 | Georgiou | 370/65.5 |
| 4,641,302 | 2/1987 | Miller | 370/60 |
| 4,692,917 | 9/1987 | Fujioka | 370/60 |
| 4,703,478 | 10/1987 | Haselton et al. | 370/94.1 |
| 4,771,419 | 9/1988 | Graves et al. | 370/58.3 |
| 4,794,520 | 12/1988 | Kobus et al. | 364/200 |
| 4,862,461 | 8/1989 | Blaner | 371/33 |
| 4,893,304 | 1/1990 | Giacopelli | 370/94.1 |
| 4,910,507 | 3/1990 | Shimizu | 370/94.1 |
| 4,926,415 | 5/1990 | Tawara | 370/94.1 |
| 4,926,420 | 5/1990 | Shimizu | 370/94.1 |
| 4,964,119 | 10/1990 | Endo et al. | 370/60 |
| 4,968,977 | 11/1990 | Chinnaswamy et al. | 370/58.1 |
| 4,979,164 | 12/1990 | Ardon | 370/58.1 |
| 4,984,235 | 1/1991 | Hillis et al. | 370/6 |

OTHER PUBLICATIONS

IBM Technical Disclosure Bulletin, vol. 21, No. 8, Jan. 1985, pp. 4690-4692, Parallel Interface Switching Mechanism, C.J. Georgiou.

Primary Examiner—Douglas W. Olms
Assistant Examiner—Min Jung
Attorney, Agent, or Firm—F. A. Gonzalez

[57] ABSTRACT

A dynamic switch and its protocol for establishing dynamic connections in a link by the use of frames, each frame having an identification of the source of the frame, an identification of the destination of the frame for the requested connection, and link controls to maintain, initiate or terminate a connection between the source and the destination. The frames are bounded by a start of frame delimiter and an end of frame delimiter which may also act as a connect link control and a disconnect link control, respectively, and the connections are made through the dynamic switch having dynamic-switch ports. The state of a dynamic-switch port is changed dependent on its present state, the dynamic connection requested, and the direction and type of frames passing through the dynamic-switch port.

25 Claims, 7 Drawing Sheets

FIG. 5

| 100 | FROM LINK ||| FROM DYNAMICALLY CONNECTED PORT |||
| --- | --- | --- | --- | --- | --- | --- |
| | PSOF 101 | CSOF 102 | DEOF 103 | PSOF 104 | CSOF 105 | DEOF 106 |
| INACTIVE | - | MS 113 | - | - | MD 117 | - |
| MONOLOG-S | - 116 | - | B 107 | D1 114 | D2 115 | B 110 |
| MONOLOG-D | D1 119 | D2 118 | B 108 | - | - | B 111 |
| DIALOG-1 | - 123 | - | B 109 | - 124 | - | B 112 |
| DIALOG-2 | - 125 | - | D1 120 | - 126 | - | D1 121 |

MS = MONOLOG SOURCE STATE
MD = MONOLOG DESTINATION STATE
D1 = DIALOG-1 STATE
D2 = DIALOG-2 STATE
- = NO STATE CHANGE
B = BUSY

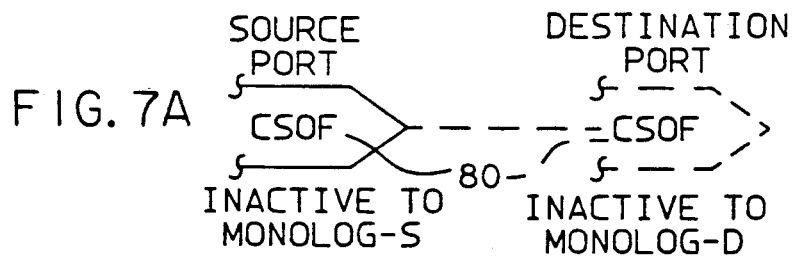
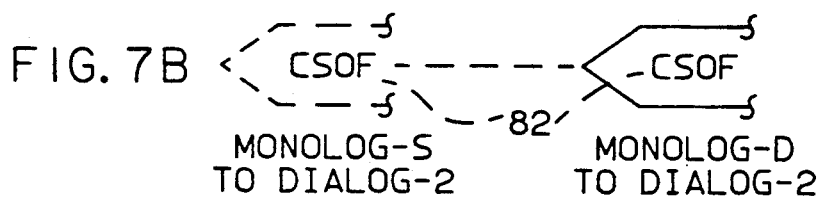
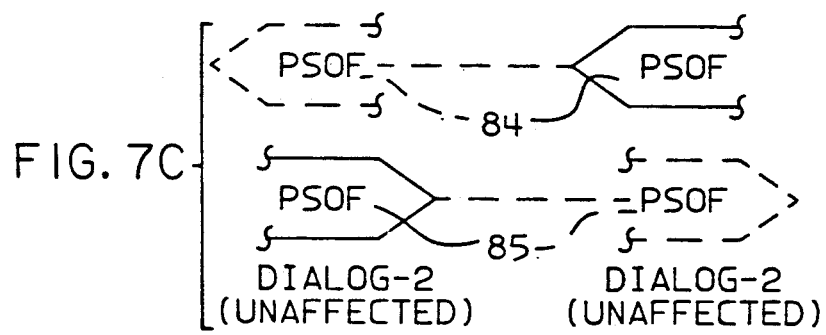
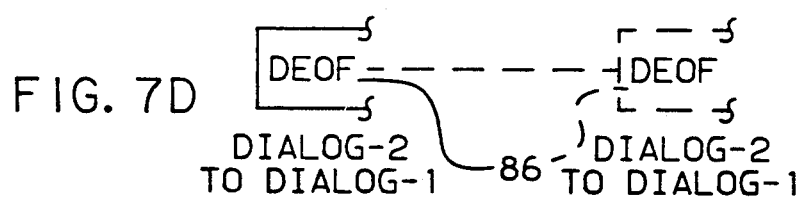
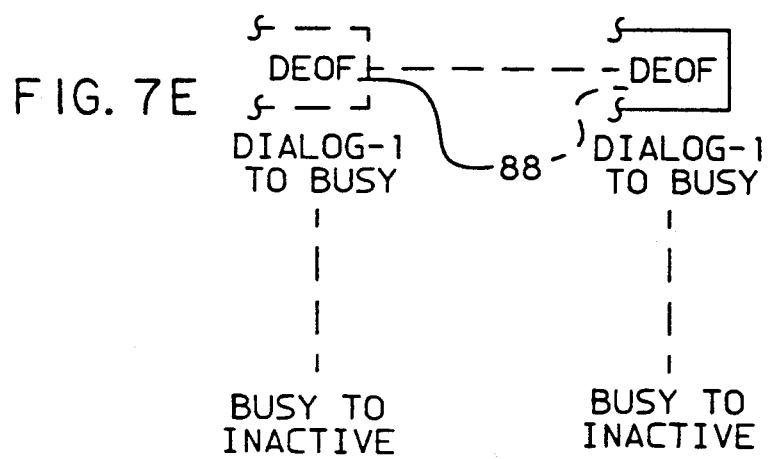

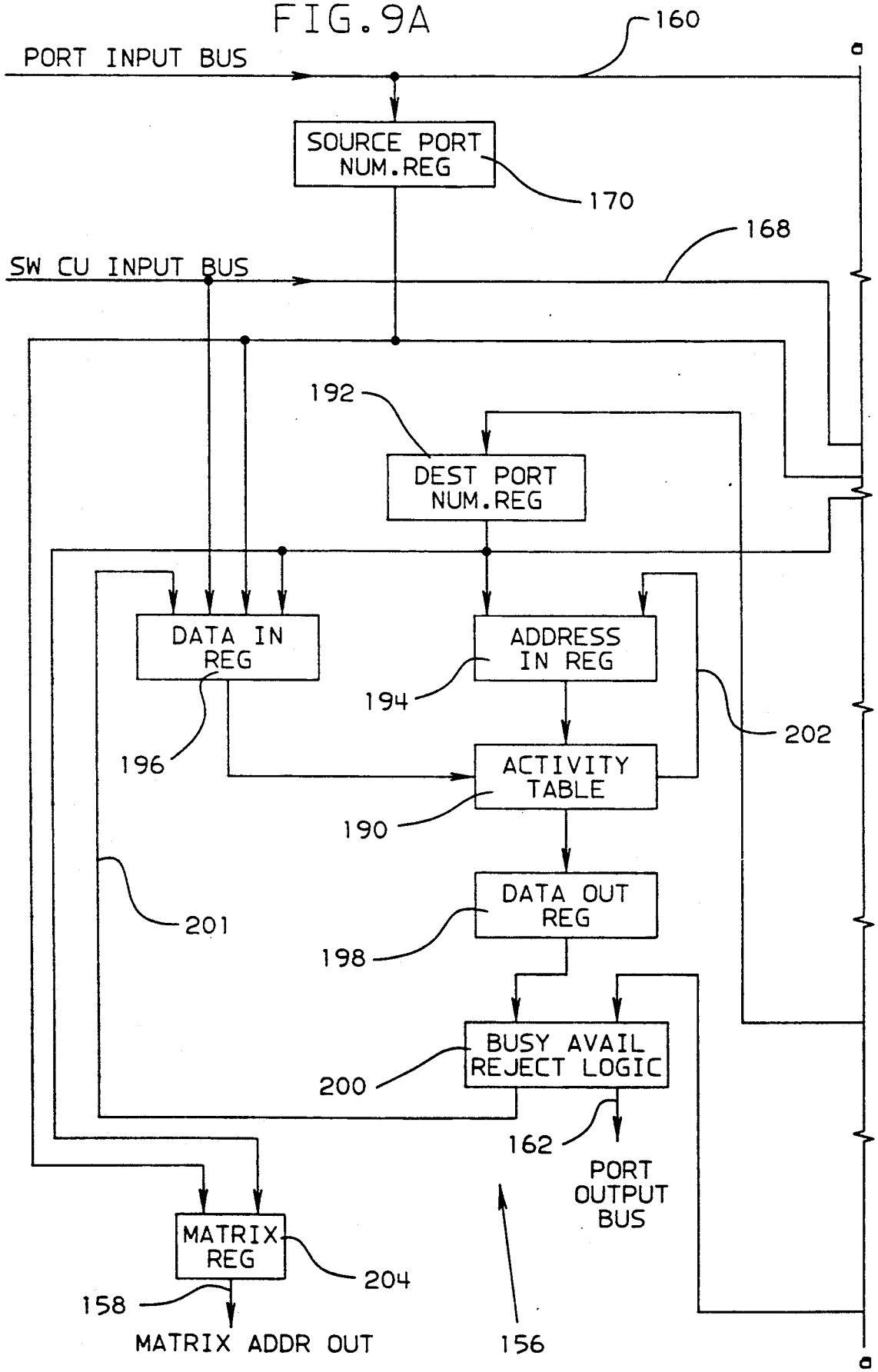

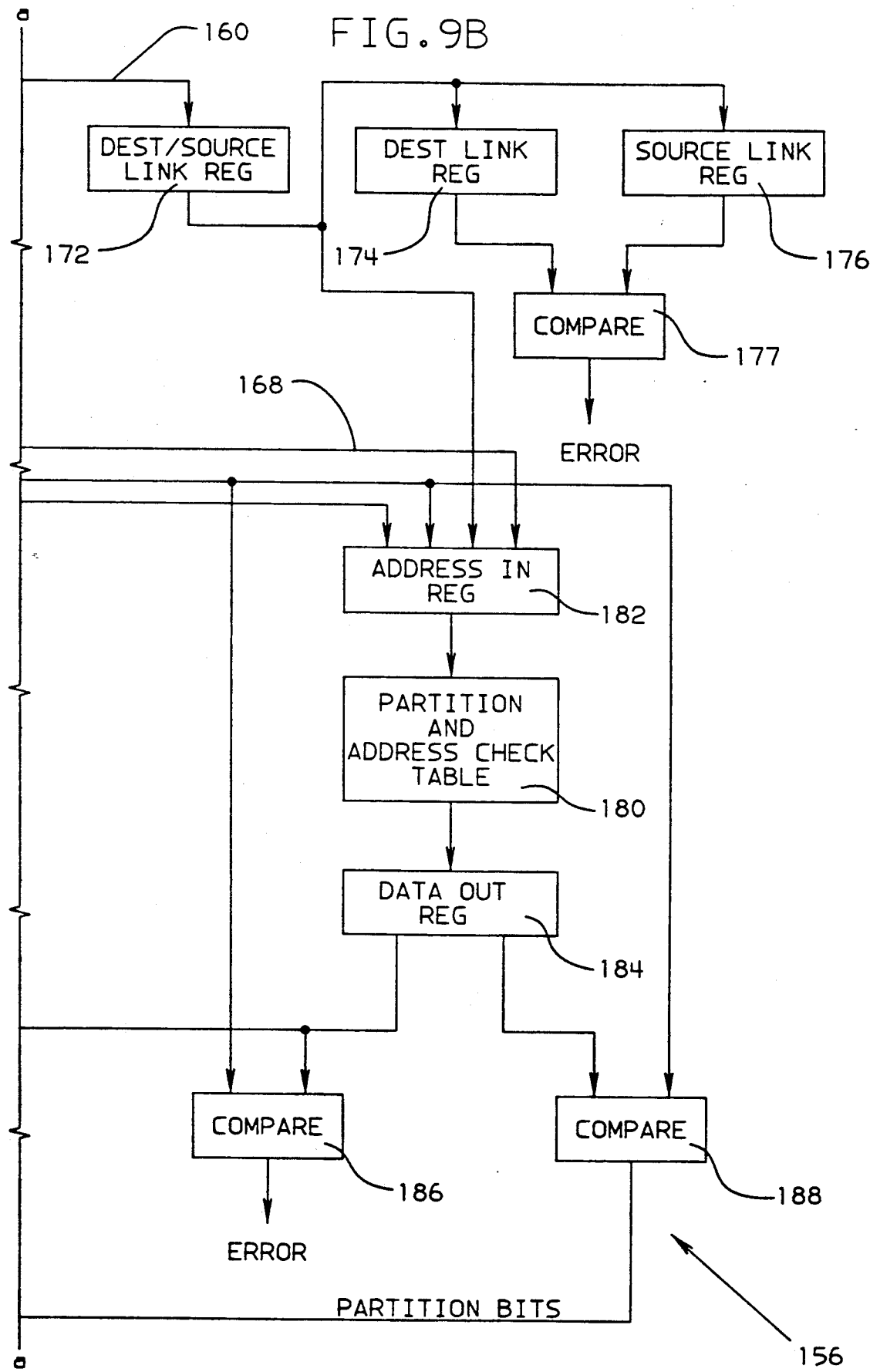

SWITCH AND ITS PROTOCOL FOR MAKING DYNAMIC CONNECTIONS

BACKGROUND OF THE INVENTION

The present invention is related to devices for establishing data communications with input/output channels of data processing equipment, and is more particularly related to a switch and its protocol for establishing dynamic connections between one input/output channel and either another input/output channel or a peripheral device in a data processing system.

Various switches such as cross-point switches are known for establishing connections between data lines. Such switches are useful in establishing point-to-point connections between an input/output (I/O) channel of a data processing system and an I/O peripheral device or control unit.

Georgiou, Parallel Interface Switching Mechanism, pp 4690-4692, IBM Technical Disclosure Bulletin, Vol. 27, No. 8, January, 1985, discloses utilizing high-speed cross-point switching chips in multiple parallel interface switching mechanisms. A controller is referred to but not shown which is used to set up connections on the switching chips in order to establish paths between channels and control units.

U.S. Pat. No. 4,074,142 to Jackson for Optical Cross-Point Switch issued Feb. 14, 1978 and discloses an optical cross-point switch for connecting any of a multiplicity of input signals to any of a multiplicity of output lines. Electrical signals are converted to optical signals by light emitting diodes. The light from each light emitting diode is focused on photosensor means to convert the optical signals back to electrical signals. An input and output address decoding circuit selects one light emitting diode to be coupled to one photosensor to make a switch connection. The address information is transmitted to the optical switch via an address bus.

U.S. Pat. No. 4,562,533 to Hodel et al. for Data Communications System to System Adapter issued Dec. 31, 1985 and discloses a data processing system having a dynamic channel exchange and a plurality of central systems. Each of the central systems has at least one serial channel control processor. The dynamic channel exchange provides switching logic for permitting each of the plurality of central systems access to a plurality of peripherals coupled to the dynamic channel exchange. The data processing system further includes an adapter which is connected to the dynamic channel exchange for providing communications between any pair of central systems.

U.S. Pat. No. 4,605,928 to Georgiou for Fault-Tolerant Array of Cross-Point Switching Matrices issued Aug. 12, 1986 and discloses a cross-point switch in which it is possible to have bi-directional operation for allowing data flow in U.S. Pat. No. 4,630,045 to Georgiou for Controller for a Cross-Point Switching Matrix issued Dec. 16, 1986 and discloses a switching matrix controller which interprets a request for connection or disconnection, determines if it is possible, selects a path through the matrix and sends control signals to the matrix to make the connection or disconnection. The status of the switching array is checked when making the connection or disconnection.

U.S. Pat. No. 4,635,250 to Georgiou for Full-Duplex One-Sided Cross-Point Switch issued Jan. 6, 1987 and discloses a one-sided cross-point switching chip which may be operated in a full duplex mode wherein the direction of information flow or electrical signals on the internal vertical lines or the interconnection lines can be in different directions, depending upon which external lines are to be interconnected.

U.S. Pat. No. 4,641,302 to Miller for High Speed Packet Switching Arrangement issued Feb. 3, 1987 and discloses a circuit arrangement for switching serial data packets through a network to one of a plurality of possible outgoing lines. The incoming serial data is in packets wherein each packet includes a header portion containing an address indicative of which one of a plurality of outgoing lines the data packet should be routed to.

U.S. Pat. No. 4,692,917 to Fujioka for Packet Switching System issued Sept. 8, 1987 and discloses a packet switching system having a packet handler for analyzing a header of each incoming packet and deciding the outgoing route of the packet. The packet also includes a packet closing flag which causes the packet handler to release the connection.

U.S. Pat. No. 4,703,487 to Haselton et al. for Burst-Switching Method for an Integrated Communications System issued Oct. 27, 1987 and U.S. Pat. No. 4,771,419 to Graves et al. for Method of and Switch for Switching Information issued Sept. 13, 1988. Both of these patents disclose switching networks for switching data wherein a header contains an address for making a connection and a termination character or characters for breaking the connection.

SUMMARY OF THE INVENTION

The I/O interface of the present invention provides for the attachment of control units or I/O devices to main frame computer channel subsystems. Existing IBM System/370, 370-XA and I/O ESA/370 instructions, CCW formats and I/O-programming techniques, as explained in the IBM System/370 Extended Architecture Principles of Operation, Publication Number SA22-7085-1 and IBM Enterprise Systems Architecture/370 Principles of Operation, Publication Number SA22-7200-0, both available from IBM Corp , can be used with channels that implement the disclosed serial-I/O interface, and the serial-I/O interface may coexist with other interfaces, such as the parallel channel-to-control unit interface. The serial-I/O interface and the parallel channel-to-control unit interface have the same basic functions for commands, status, and data, but the means for transmitting these functions on the two interfaces are considerably different. It will be understood that, while the present invention is discussed in the serial-I/O interface environment, the invention may be used in any information transfer system, and can be used, in addition to the communication between channels and control units disclosed, for communications between peer-coupled entities as well as for master-slave coupling of channels and control units. The transmission medium for the serial-I/O interface is called a link, and consists of two conductors, one for receiving and one for sending. The link provides a physical connection which may be used between the channel and a control unit, the channel and a dynamic switch, and the control unit and the dynamic switch. The unit of transmission is a frame. Information is transferred in a frame as encoded fields in a serially transmitted synchronous bit stream.

Frames are used to transfer control information, data, commands, or status. Additionally, sets of frames are used to initiate an I/O operation, perform data transfer, and end an I/O operation.

The frame structure and the type of protocols used optimize the use of a higher bandwidth. By using protocols that facilitate the transfer of large blocks of data at up to 98 percent of the available bandwidth capability of the link, the data-transfer requirements of very high-speed devices such as direct access storage devices and tapes can be met. The serial-I/O interface can handle the data-transfer requirements of a wide range of other I/O types by providing for the selection of the optimum combination of frame size, frame rate, and quantity of data per data request.

The present invention provides a protocol for establishing dynamic connections in a serial link using frames, each frame having a beginning of frame delimiter, an end of frame delimiter, an identification of the source, and an identification of the destination of the requested connection. The delimiters may initiate a connect or a disconnect operation between the source and the destination.

It is therefore an object of the present invention to provide a dynamic connection switch whose operating state is dependent on the number, direction and type of frames transmitted through the dynamic connection switch.

It is another object of the present invention to provide a switch for making dynamic connections in a data link between a channel and a device such as a peripheral control unit or another channel.

It is another object of the present invention to provide a protocol for establishing dynamic connections in a link containing a dynamic switch.

The foregoing and other objects, features and advantages of the invention will be apparent from the following more particular description of the preferred embodiment of the invention as illustrated in the drawings.

BRIEF DESCRIPTION OF THE DRAWINGS

FIG. 5 is a state diagram showing the change of states of a dynamic switch port of the dynamic switch of FIG. 1 wherein the dynamic switch port is in one of the inactive, monolog-S, monolog-D, dialog-1 or dialog-2 states.

FIGS. 7A through 7E, taken together, provide a representation of the operation of the dynamic switch, during a dialog 2 operation;

FIGS. 9A and 9B, joined along line a—a, form a block diagram of the matrix controller of FIG. 8.

DESCRIPTION OF THE PREFERRED EMBODIMENT

Figure 1:
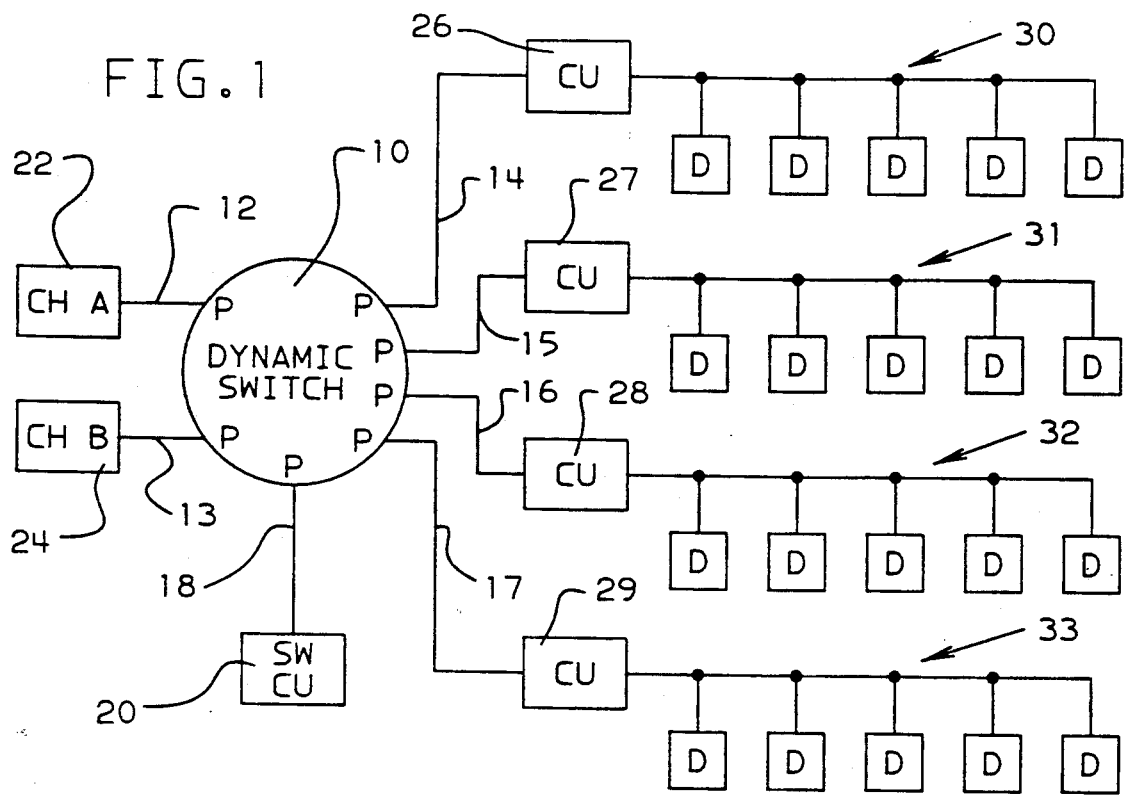
FIG. 1 is a block diagram of an I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P connected to one end of a plurality of links 12-18. One of the links 18 is connected to a dynamic switch control unit 20, and each of the other links 12-17 is connected to either a channel, such as channel A designated 22 or channel B designated 24, or to one of the control units 26-29. Each of the control units 26-29 control a plurality 30-33 of peripheral devices D, respectively.

Each of the channels 22 and 24 is a single interface on a System/370 or a 370-XA channel subsystem. The channels 22 and 24 direct the transfer of information between I/O devices of the pluralities 30-33 of devices D and main storage (not shown) of the data processing system and provide the common controls for the attachment of different I/O devices D by means of a channel path (to be defined). The channels 22 and 24 are serial channels wherein data is transmitted and received in a serial format, as will be explained.

Each of the links 12-17 is a point-to-point pair of conductors that may physically interconnect a control unit and a channel, a channel and a dynamic switch (such as links 12 and 13), a control unit and a dynamic switch (such as links 14-17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in the aforementioned U.S. Pat. Nos. 4,605,928; 4,630,045; and 4,635,250, incorporated by reference herein. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

In the disclosed embodiment, the dynamic switch 10 can establish or remove a dynamic connection between two ports P based on the information provided by certain frame delimiters in the serial frames transmitted over the links (to be explained), and based on conditions present at each of these ports P.

The dynamic switch can establish or remove a static connection between two ports P as a result of commands received by means of the local or remote facilities of the dynamic-switch control unit 20. Frame delimiters or other sequences (to be explained) received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

In one embodiment, the dynamic switch 10 may have a maximum of 254 ports P. Since it takes two ports to make a connection, the maximum number of possible simultaneous connections is equal to half the number of ports P implemented. It will be understood that if the quantity of ports P is an odd number, then the maximum is half of the maximum number of ports P less one. A port P does not have a link address and, therefore, is not uniquely addressable. However, an association between a port P and either a destination link address or a source link address is provided by the dynamic switch, as will be explained. The dynamic switch 10 has a matrix controller, discussed herein in connection with FIG. 8, which contains the information used to make and break connections between the ports P.

The dynamic switch 10 has one dynamic-switch control unit 20, which is assigned the unique link address of its link 18. The dynamic-switch control unit 20 is connected to the dynamic switch 10 as though it were attached to the dynamic switch by means of a port P and is available for dynamic connections like any other control unit attached to the dynamic switch 10. Through facilities provided by the dynamic-switch control unit 20, changes can be made to information in the matrix controller (to be explained) of the dynamic switch 10 concerning an individual port P which alters the ability of that port to be dynamically connected with another port.

Figure 2:
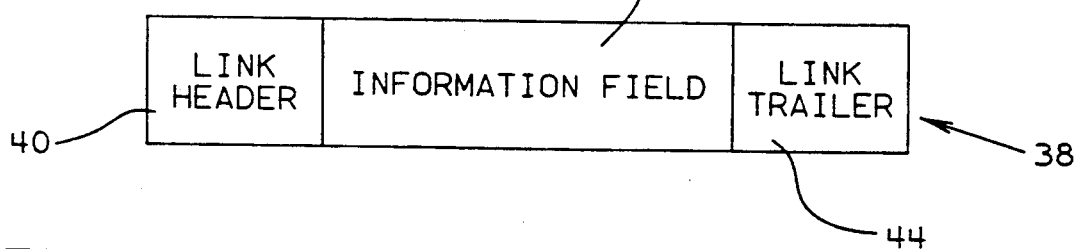
FIG. 2 is a diagrammatic representation of a data frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by two hierarchical levels of functions and serial-I/O protocols, the link level and the device level. Link level protocols are used whenever a frame is sent. These protocols determine the structure, size, and integrity of the frame. Link protocols also provide for making the connection through the dynamic switch 10 and for other control functions which are unrelated to this invention. Each channel and each control unit contains a link-level facility, which is the embodiment of the link protocols. The device level is used to convey application information such as the data which is transferred from an input-output device to the channel. A frame which contains application information or controls is called a device-level frame. A frame which is used solely for link level protocol is called a link-control frame.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

The dynamic-switch control unit 20 has a link address assigned to it for the purpose of communicating with the channels and control units attached to the switch.

With the configuration of FIG. 1, contention created by two or more switch ports P receiving a frame requiring a dynamic connection to the same switch port P and its respective link is resolved by the facilities within the dynamic switch based on the conditions present. This contention is resolved, independent of whether a channel or control unit is attached to the link from each port involved. When the contention is resolved, only one of the contending ports becomes dynamically connected to the required port, while the other contending ports indicate on their respective links that a port-busy condition exists at the dynamic switch.

If the desired connection cannot be made, the dynamic switch 10 returns a link-control response frame containing a reason code giving the reason why the connection was not made. For example, when an error is detected in a frame that initiates a connection, a link-control-frame response (referred to herein as a response frame) called dynamic-switch-port-reject is sent including a reason code which indicates that a transmission error has occurred. Some responses are generated by the ports P, and some responses are generated by the matrix controller of the dynamic switch 10.

Figure 3:
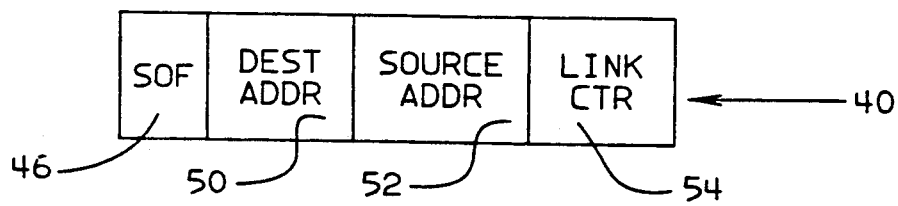
FIG. 3 is a diagrammatic representation of a link header of the data frame of FIG. 2.
Figure 4:
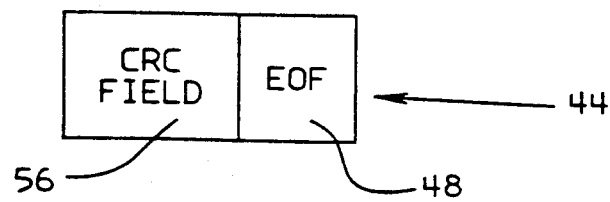
FIG. 4 is a diagrammatic representation of a link trailer of the data frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent eight-bit data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, assigned by the assignee of the present invention and incorporated herein by reference. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or dynamic-switch-port-reject conditions are present, the connection is made and the frame is routed to the destination port. If a connection exists and the source port receiving the frame is in the monolog-D state (to be explained), the frame is discarded, and a dynamic-switch-port-busy response frame with a source-port-busy monolog-D reason code is sent to the source of the frame requesting the dynamic connection. If a connection exists and the receiving port is in the monolog-S, dialog-1, dialog-2 (to be explained) or static state, the frame is routed to the currently connected link.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame of future request frames to the same link-level facility.

The link-control field 54 indicates the type and format of the frame. The link-control field 54, which is the last field of the link header 40, immediately follows the source-address field 52. For the purposes of the present invention, the link-control field 54 indicates whether the frame is a link control frame or a device frame. When the frame is a link control frame, the link-control field 54 also indicates the function of the frame. Some of these functions are dynamic-switch-port reject, link-level reject, link-level busy, dynamic-switch port busy, and other functions necessary to report the status for link level facilities.

The information field 42 is the first field following the link header 40. The size of the information field depends on the function performed by the particular frame. The aforementioned reason code, for instance, is transmitted in the information field 42 of response frames.

The link trailer 44 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific train of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

The distinction between the two EOF delimiters may also be used by the receiving link-level facility to determine what type of response or recovery action is appropriate for the frame. For example, if transmission of a frame is ended by a PEOF delimiter, a link-level-reject-frame response can be returned, but if transmission of a frame is ended by a DEOF delimiter, a link-level-reject-frame response cannot be returned.

Although in the present embodiment, the delimiters are connection defining data (sometimes referred to herein as flags) used to initiate connections or disconnections, such connection defining data may be contained elsewhere in the frames.

Idle characters are sent over the links when frames are not being transmitted. These idle characters, which are special characters not having data values, maintain the links in synchronism. Sequences of special idle characters are also transmitted to provide limited communication of special commands such as unconditional-disconnect and unconditional-disconnect response. These special sequences are not part of the present invention, and will not be discussed further except to indicate that they may affect dynamic connections.

FIG. 5 is a state diagram showing the states that a port P may be in. The column 100 on the left side of FIG. 5 shows the possible states which are inactive, monolog source or monolog-S, monolog destination or monolog-D, dialog-1 and dialog-2. The three columns 101, 102 and 103, for the delimiters PSOF, CSOF and DEOF, respectively, show the states that the port changes to when it is in the state of column 100 and receives the indicated delimiter of the columns 101, 102 and 103 from the connected link. The columns 104, 105 and 106, for the delimiters PSOF, CSOF and DEOF, respectively, shows the states the port changes to when it is in the state of column 100 and receives the indicated delimiter of columns 104, 105 and 106 from the dynamically connected port through the dynamic switch 10.

A dynamic switch port P can be in an inactive state, a link busy state or in one of the connection states. The connection states are monolog-S, monolog-D, dialog-1 and dialog-2. All of these states are mutually exclusive. The state of a dynamic-switch port P determines the actions to be taken when specific events occur on the link or at other ports.

Referring to the inactive state, the dynamic-switch port is in the inactive state when it is not in any of the other states. In the inactive state, a dynamic-switch port P can accept or initiate the establishment of a dynamic connection with another dynamic-switch port P.

A port may enter the inactive state only from the link-busy state. The port transmits idle characters on the link in the inactive state.

If a port in the inactive state receives an initiate-connection control and subsequent data from the link (column 101 and 102 of FIG. 5) and (1) the data contains valid destination and source link addresses 50 and 52, (2) the port associated with the destination link address 50 is in the inactive state, and (3) a dynamic connection with that port is permitted, then a dynamic connection with that port is established. If either link address 50 or 52 in the received data is invalid or if the port associated with the destination link address 50 is not in the inactive state or is otherwise unavailable for dynamic connection, a dynamic-switch-port-reject response frame or dynamic-switch-port-busy response frame, as appropriate, is returned on the link.

A port leaves the inactive state when a dynamic or static connection is established, a link error or link failure is recognized, a sequence is recognized, a port failure is detected, or the port is taken offline.

As mentioned, a dynamic-switch-port state change to the inactive state is only permitted from the link-busy state, that is, the link-busy state is used as a transition state for other state changes to the inactive state.

Referring further to the link-busy state, when a dynamic-switch port P is in the link-busy state because of internal reasons, the port is unable to accept or initiate the establishment of a dynamic connection. The link-busy state is a normal occurrence at the dynamic-switch port and is considered to be temporary; the port is still considered to be usable. The link-busy state is used as a transition state before returning to the inactive state and may be entered for internal reasons, for example, to facilitate the recording of a detected error condition.

The link-busy state may be entered from any connection state except the dialog-2 state (see 107-112). The port transmits idle characters on the link while in the link-busy state unless a frame with a CSOF delimiter is received from the link, in which case a dynamic-switch-port-busy response frame with a source-port-busy-unconnected port-busy reason code is returned.

A port leaves the link-busy state when no busy condition exists, a static connection is established, a link-signal error or link failure is recognized, a sequence is recognized, a port failure is detected, or the port is taken offline.

A dynamic-switch port may be caused to enter the connection state when a CSOF delimiter followed by a valid transmission character is received from a link (see column 102).

When a dynamic-switch port P in the inactive state has received an initiate-connection control, causes a dynamic connection to be established accordingly, and has started the transfer of the initiate connection control to the connected port, the port enters the monolog-S state (113).

The monolog-S state may be entered only from the inactive state. The port transmits idle characters on the link in the monolog-S state.

When a port in the monolog-S state receives a frame from a dynamically connected port, it enters the dialog-1 state if the frame has a PSOF delimiter (114) or enters the dialog-2 state if the frame has a CSOF delimiter (115). When a port in the monolog-S state receives a frame from the link, the frame is passed to the dynamically connected port and remains in the monolog-S state (116). If a DEOF delimiter is detected, the port enters the link-busy state (107).

A port leaves the monolog-S state when a frame is received from the dynamically connected port, a DEOF delimiter is detected (110), a static connection is established, a link-signal error or link failure is recognized, a sequence is recognized, a dynamic-switch idle timeout is recognized, a port failure is detected, the port is taken offline, or a condition associated with the connected port requires removal of the dynamic connection.

When a dynamic-switch port P in the inactive state determines that a dynamic connection with another port has been established at other than its own initiative and starts receiving an initiate-connection control from the other port, it enters the monolog-D state (117).

The monolog-D state may be entered only from the inactive state. In this state, the port transmits idle characters on the link when it is not transmitting frames received from the connected port. Frames received from the connected port are transmitted on the link without a change of state. When a DEOF delimiter is detected in information passed to the link, the port enters the link-busy state (111). If a port in the monolog-D state receives an initiate-connection control with subsequent data from the link with a destination link address associated with a port other than that with which a dynamic connection exists, a dynamic-switch-port-busy response frame with a source-port-busy monolog-D busy reason code is returned. If the destination link address matches the link address associated with the dynamically connected port, the port enters the dialog-2 state (118) and passes the frame to the connected port. If a port in the monolog-D state receives a frame with a PSOF delimiter from the link, the port enters the dialog-1 state (119) and transmits the frame to the dynamically connected port.

A port leaves the monolog-D state when a frame with a CSOF delimiter containing a destination link address corresponding to the connected port (118) or a frame with a PSOF delimiter is received from the link (119) and passed to the connected port, a DEOF delimiter is received from the link (108), a DEOF delimiter is received from the connected port (111), a static connection is established, a link-signal error or link failure is recognized, a sequence is recognized, a port failure is detected, the port is taken offline, or a condition associated with the connected port requires removal of the dynamic connection.

A port P is caused to enter the dialog-2 state when a dynamic connection is established between two ports, each of which has received an initiate connection control from the link which requires that a dynamic connection be established with the other port. Specifically, (1) when a dynamic switch port in the monolog-D state receives an initiate-connection control and subsequent data from the link with a destination link address associated with the port with which it is connected, the initiate-connection control is passed to the connected port and the port enters the dialog-2 state (118) or (2) when a dynamic-switch port in the monolog-S state receives an initiate-connection control passed through the dynamic connection, the port enters the dialog-2 state (115) and transmits the initiate-connection control on its link.

The dialog-2 state may be entered only from the monolog-S or monolog-D states as described. In the dialog-2 state, the port transmits idle characters on the link when it is not transmitting frames received from the connected port. Frames received from the connected port are transmitted on the link and frames received from the link are passed to the connected port without a change of state. When a DEOF delimiter is detected in information received from or passed to the link, the port enters the dialog-1 state (120 and 121, respectively).

A port leaves the dialog-2 state when a DEOF delimiter is detected (120 and 121), a static connection is established, a link-signal error or link failure is recognized, a sequence is recognized, a dynamic-switch idle timeout is recognized, a port failure is detected, the port is taken offline, or a condition associated with the connected port requires removal of the dynamic connection.

A port P with a dynamic connection to another port is caused to enter the dialog-1 state when a frame with a PSOF delimiter, in response to an initiate connection control which caused a dynamic connection to be established, is received by the port from the link (119) or is passed through the dynamic connection to the port (114). Specifically, (1) when a dynamic-switch port P in the monolog-D state receives a frame with a PSOF delimiter from the link, the frame is passed to the connected port through the dynamic connection and the port enters the dialog-1 state (119) or (2) when a dynamic-switch port P in the monolog-S state receives a frame with a PSOF delimiter passed through the dynamic connection, the port enters the dialog-1 state (114) and transmits the frame on its link. Each of two dynamically connected ports are also caused to enter the dialog-1 state if, while in the dialog-2 state, a frame with a DEOF delimiter is received from the link (120) and passed through the dynamic connection (121).

The dialog-1 state may be entered only from the monolog-S, monolog-D, or dialog-2 state. In this state, the port transmits idle characters on the link when it is not transmitting frames received from the connected port. Frames received from the connected port are transmitted on the link and frames received from the link are passed to the connected port without a change of state. When a DEOF delimiter is detected in information received from or passed to the link, the port enters the link-busy state (109 and 112, respectively).

A port leaves the dialog-1 state when a DEOF delimiter is detected (109 and 112), a static connection is established, a link-signal error or link failure is recognized, a sequence is recognized, a dynamic-switch idle timeout is recognized, a port failure is detected, the port is taken offline, or a condition associated with the connected port requires removal of the dynamic connection.

FIGS. 6A-6D and 7A-7E show the changes of the states of dynamic-switch ports P as link-level frames are transmitted through the dynamic switch 10. In FIGS. 6A-6D and 7A-7E, frames passing through a first port are shown as solid figures, and those same frames passing through a second, connected port are shown in phantom. The reference numbers in parenthesis refer to the state diagram of FIG. 5.

FIGS. 6A-6D, taken together, illustrate the establishment of a dynamic connection between ports of the dynamic switch 10 in which a connection is requested from one source only, however, frames may be transmitted in either direction between the connected ports. The connection of FIGS. 6A-6D is referred to herein as dialog-1, since frame transmission may be in either direction, but an initiate-connection control has been received in only one direction.

Figure 6A:
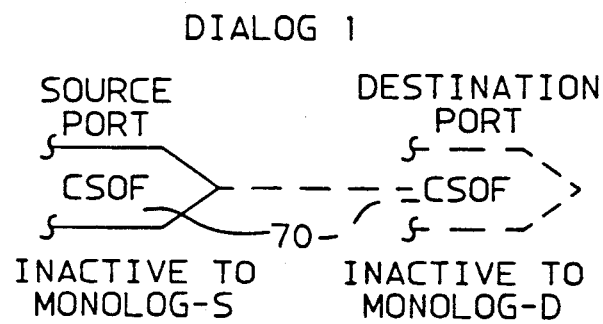
FIGS. 6A through 6D, taken together, provide a representation of the operation of the dynamic switch during a dialog 1 operation.
Figure 6B:
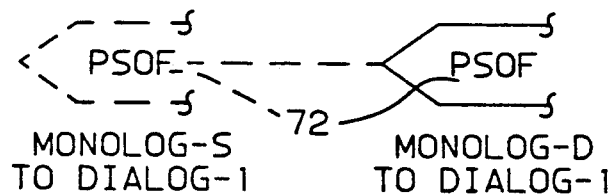
Figure 6C:
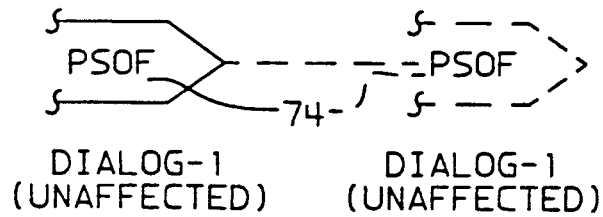
Figure 6D:
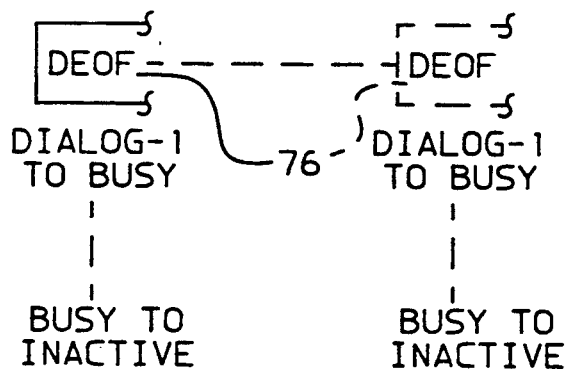

In FIG. 6A, a frame 70 has a CSOF, changing the state of the source port from inactive to monolog-S (113), and the state of the destination port from inactive to monolog-D (117). In FIG. 6B a frame 72 having a PSOF (which may be a device level frame) is then passed by the destination port to the source port. The PSOF delimiter of frame 72 changes the state of the destination port from monolog-D to dialog-1 (119), and the state of the source port from monolog-S to dialog-1 (114). It will be understood that the frame 72 will have the identification of the link-level facility attached to the destination port in its source-address field 52, and the identification of the link-level facility attached to the source port in its destination-address field 50, since the frame 72 is actually traveling from the port marked destination to the port marked source in FIG. 6B. In FIG. 6C, a subsequent frame 74 having a PSOF delimiter traveling from the source port to the destination port will leave the states of the source and destination ports unchanged, or in the dialog-1 states (123 and 124). In FIG. 6D, a frame 76 (which may be frame 74 or a different frame) having a DEOF changes the states of the source and destination ports from dialog-1 to busy (109 and 112). After a selected length of time, the states of the source and destination ports changes from busy to inactive.

FIGS. 7A-7E, taken together, illustrate the operation of two ports of the dynamic switch 10 in which the dynamic connections are made by CSOF delimiters of frames traveling between the source and destination ports in the illustrated directions. This operation is referred to herein as dialog-2. Although both ports of FIGS. 7A-7E act as either the source port or the destination port, depending on the direction of travel, the source of the first frame 80 will be referred to as the source port in FIGS. 7A-7E, and its destination will be referred to as the destination port. The first frame 80 has a CSOF, and changes the state of the source port from inactive to monolog-S (113), and the state of the destination port from inactive to monolog-D (117). In FIG. 7B, frame 82 travels from the right to the left, the destination port to the source port, and also has a CSOF. The CSOF of frame 82 changes the state of the port marked destination port from monolog-D to dialog-2 (118), and the state of the port marked source port from monolog-S to dialog-2 (115).

As shown by frames 84 and 85 in FIG. 7C, frames having PSOF delimiters may then move in either direction without changing the states of the ports from dialog-2 (125 and 126). In FIG. 7D, a subsequent frame 86, shown in FIG. 8 as moving from the source port to the destination port, has a DEOF delimiter which changes the states of the ports from dialog-2 to dialog-1 (120 and 121). It will be understood that frame 86 may be traveling in either direction to change the states. In FIG. 7E, a subsequent frame 88 having a DEOF changes the states of the ports from dialog-1 to busy (109 and 112). After a selected length of time, the states of the ports changes from busy to inactive.

It will be understood that the frames 80 and 82 could be received nearly simultaneously, each with an initiate-connection control unrelated to the other. The dialog-2 state thus prevents the link from being broken by a disconnect in one direction before communication traffic in the other direction is finished.

Figure 8:
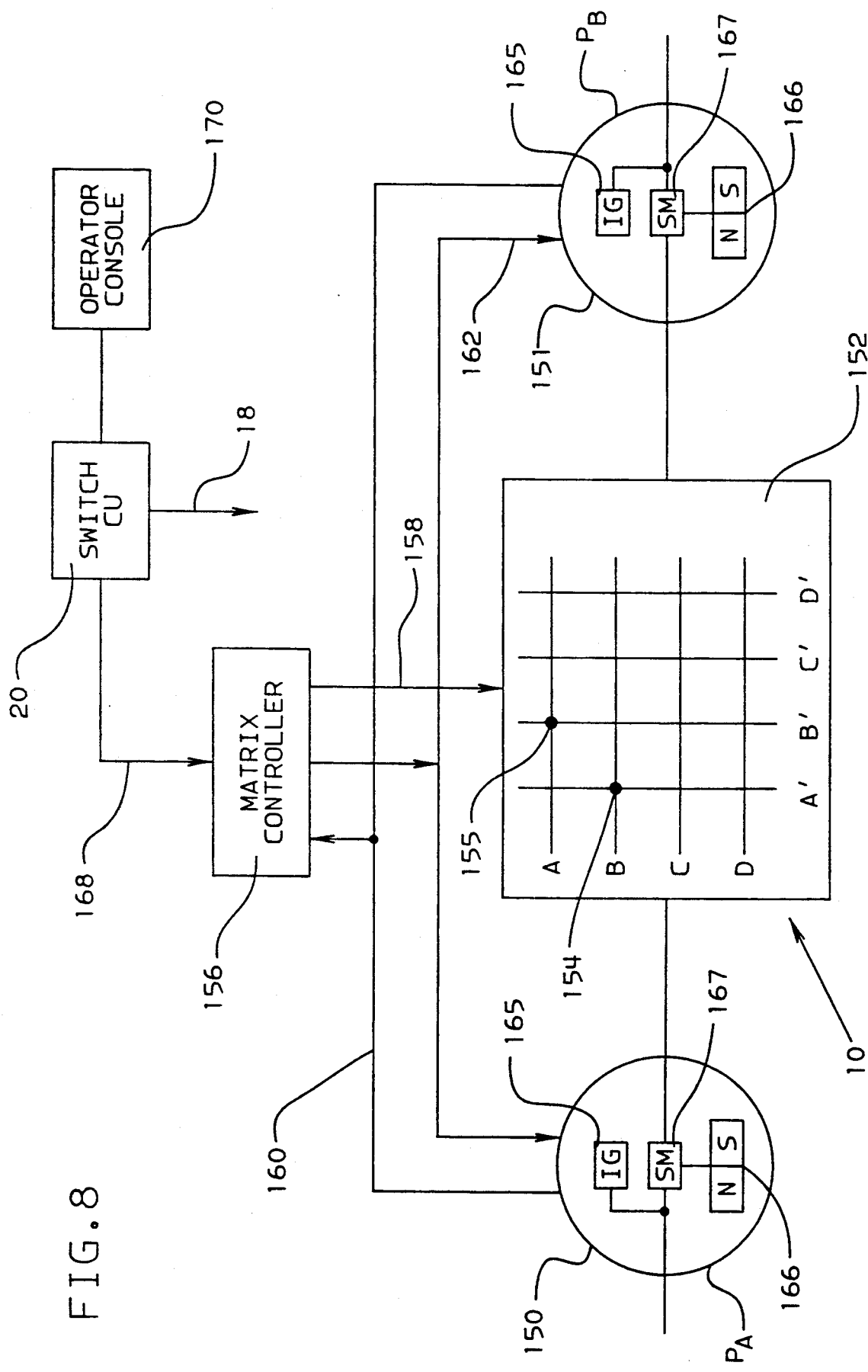
FIG. 8 is a block diagram of a dynamic switch and a dynamic switch control unit, wherein the dynamic switch has ports, a matrix, and a matrix controller.

FIG. 8 is a block diagram of the dynamic switch 10 of FIG. 1, and includes only two dynamic-switch ports $P_A$ 150 and $P_B$ 151. The ports $P_A$ 150 and $P_B$ 151 are connected through a double sided matrix 152. The matrix 152 is made up of a plurality of parallel horizontal conductors A-D and a plurality of parallel vertical conductors A'-D'. Switches 154 and 155 at the cross-points of conductors A and B' and B and A', respectively, have been closed by initiate-connection controls to make the two way connection of the ports 150 and 151, as previously described. The actual connections of the matrix 152 is controlled by a matrix controller 156 over a matrix address output bus 158. The matrix controller 156 contains storage for storing the connections of the ports of the dynamic switch 10, the allowable connections which may be made, whether the connections are dynamic or static, and other information for the operation of the dynamic switch 10, as will be explained in connection with FIG. 10.

The matrix controller 156 is connected to the matrix 152 by the mentioned matrix address output bus 158, receives data from the ports 150 and 151 via a port input bus 160, and sends data to the ports 150 and 151 via a port output bus 162. Control signals over the bus 158 control the cross-point switches of the matrix 152, such as switches 154 and 155.

Information needed to request dynamic connections is sent by the ports P to the matrix controller via bus 160, and the matrix controller 156 responds to the ports P with information saying the requested connections are rejected or allowed, as applicable. Each port P contains storage 166 for storing a port number assigned to the port at initialization, and the port's status. Thus, the port can send a reject frame back to a requesting source if the port is busy, or if the port is not busy, inform the matrix controller 156 of a requested connection to see if the request is allowed. As will be explained, when a port P sends a request to the matrix controller 156, the port number from the storage 166 in the port P is included so that the matrix controller knows which port sent the request.

The dynamic switch control unit 20 is connected to the matrix controller 156 by a dynamic switch control unit input bus 168 for such purposes as making static connections in the matrix 152, blocking access to or fencing a port, and grouping ports together into partitions such that a port P may only be connected to another port in the same partition. An operator console 170 is part of the dynamic switch control unit 20 for inputting the mentioned information, or the information may be sent to the dynamic switch control unit 20 via the link 18, which is connected to one of the ports P of the dynamic switch 10, as discussed in connection with FIG. 1.

Each port may include an idle generator (IG) 165 which generates idle characters for transmission over the port's link, as previously described. The idle generator 165 may be constructed as described in the patent application titled "Transmitting Commands Over a Serial Link", attorneys docket number P09-88-012, and assigned to the assignee of the present invention, which application is herein incorporated by reference. It will be understood that idle characters for transmission over the ports' link may be passed through the matrix 152 from the dynamically connected port instead of coming from the idle generator 165.

Each port determines its own state based on the state in its storage 166 and the delimiters of frames from either its link or from its dynamically connected port by means of a state machine (SM) 167 which determines the state of its port in accordance with FIG. 5. In the preferred embodiment, the state machine 107 may be implemented in hardware, or may be implemented by microprocessor executed microcode, if desired. The design of such hardware or microcode may be accomplished by one skilled in the art by use of the state diagram of FIG. 5 and the examples of FIGS. 6A-6D and 7A-7E.

FIGS. 9A and 9B, joined along line a—a, form a block diagram of the matrix controller 156 of FIG. 8. The port input bus 160 is connected to a source port number register 170 for storing the source port number sent by the port P to the matrix controller 156. The port input bus 160 is also connected to a destination and source link register 172 for receiving and storing, in different bus cycles, the destination and source link addresses as received by the port P from fields 50 and 52 of the frame. The destination link address 50 is stored in the destination link register 174, and the source link address 52 is stored in the source link register 176, and the contents of these registers 172 and 174 are compared by a comparator 177. The comparator 177 generates an error interrupt if the destination link address is the same as the source link address.

A partition and address check table 180 provides a translation function for translating the destination and source link addresses to a port number used by the matrix controller to address the cross-point switches of the matrix 152. The partition and address check table also includes partition bits to indicate which partition, if any, the port is in. All link addresses which go into the the partition and address check table 180 pass through the address in register 182, and the port data from the table 180 goes to the data-out register 184.

A comparator 186 is provided to insure that the source port number from the register 170 is the same as the port number translated by the partition and address check table 180 for the source link address from register 172. A comparator 188 is also provided to insure that the partition of the source port, which is a part of the source port number from the port input bus 160 to the register 170, is the same as the partition from the partition and address check table 180.

An activity table 190 is a content addressable storage device which contains the connections of the ports P of the dynamic switch 10, and an indication if the ports are busy, their status, if the ports are unavailable such as in port fencing, and if the connection of a port is static or dynamic. The entries in the activity table 190 contain the port number and connections bits which indicate the connection data. A destination port number register 192 is connected to the data out register 184 for receiving the destination port number from the partition and address check table 180, and provides the destination port number to an address in register 194 for the activity table 190. A data in register 196 receives the port number and connection bits for storage in the activity table 190, and a data out register 198 receives data from the activity table 198 and supplies the data to busy, available and reject logic 200 along with the results of the partition comparison of comparator 188. The busy, available and reject logic 200 provides a message over the port output bus 162 to the requesting port indicating if the requested connection is allowable, or if not, if the port to which connection is requested is busy, fenced and unavailable, in the wrong partition, one port of a static connection, or in the wrong state for the requested connection. If the connection is not allowed, the information supplied by the busy, available and reject logic 200 over bus 162 is used by the source port to return a suitable response frame to the source link with the proper reason code in the information field. Feedback paths 201 and 202 are provided allow the activity table 190 to be modified in a read, modify, write mode. If the connection is allowed, the matrix controller makes the requested connection, and the frame is transmitted from the source port to the now connected destination port for transmission over the destination port's link.

The address in register 182 is connected to the dynamic switch control unit input bus 168, the source port number register 170, the destination port number register 192, and the destination/source link register 172 such that the partition bits of the source and destination ports may be modified using the port number, and the destination and source link addresses may be translated to port numbers as described. The data in register 196 for the activity table 190 is connected to the dynamic switch control unit input bus 168, the source port number register 70, and the destination port number register 192 such that modifications to the connection data and inquiries regarding the connections to the ports may be made to the activity table 190.

The source port number register 170 and the destination port number register 192 are connected to a matrix register 204, which is connected to the matrix address output bus 158 for controlling the cross-point switches of the matrix 152 of FIG. 8 if the connections are to be made or broken by the matrix controller 156.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desired to secure by Letters Patent is:

1. In a dynamic connection device having a plurality of ports each having operating states for receiving and transmitting data, a protocol system comprising:
   transmission means for transmitting a frame from a source port to a destination port, said frame containing an identification of said destination port, an identification of said source port and connection defining data for defining a connection between said destination and source ports, the frames transmitted by said transmission means having a first number of frames transmitted in a first direction from the source port to the destination port and a second number of frames transmitted in a second direction from the destination port to the source port;
   state memory means for memorizing the operating state of said source port and said destination port; and
   port state means for controlling the operating state of each of said ports responsive to said state memory means, said first and second number of frames transmitted in said first and second directions, and said connection defining data of frames through said ports.

2. The protocol system of claim 1 wherein said connection defining data is contained in start and end of frame delimiters bounding said frames, and said port state means include means responsive to said start and end of frame delimiters for controlling the operating state of each of said ports.

3. The protocol system of claim 1 wherein said state memory means comprises storage in each port for storing the operating state of its respective port, and said port state means comprises state diagram means in each port for determining the operating state of its respective port responsive to the stored operating state and the direction and type of connection defining data contained in said frames.

4. The protocol system of claim 3 wherein said state diagram means maintains its port in a connected operating state responsive to connect flags in said connection defining data until the state diagram means receives a like number of disconnect flags in said connection defining data.

5. In a system for the bi-directional transmission of frames, each frame being bounded by a start of frame delimiter and an end of frame delimiter, a method for controlling the state of a port for receiving and transmitting said frames comprising the steps of:
   a. initially placing said port in an inactive state;
   b. changing the state of said port to a monolog state responsive to the receipt by said port of a first frame in a first direction, said first frame having a first type of start of frame delimiter;
   c. changing the state of said port to a dialog-2 state responsive to the receipt by said port of a second frame in a second direction, said second frame having said first type of start of frame delimiter;
   d. changing the state of said port to a dialog-1 state responsive to the receipt by said port of a third frame in one of said first or second directions, said third frame having a first type of end of frame delimiter; and
   e. changing the state of said port back to said inactive state responsive to the receipt of said port of a fourth frame in the other of said first or second direction, said forth frame having said first type of end of frame delimiter.

6. The method of claim 5 wherein said first type of start of frame delimiter is an initial connect sequence.

7. The method of claim 6 wherein said first type of end of frame delimiter is a disconnect sequence.

8. The method of claim 5 further comprising between the steps b and c, the step b1 comprising changing the state of said port to said dialog-1 state responsive to the receipt by said port of a frame having a second type of start of frame delimiter.

9. The method of claim 8 wherein said second type of start of frame delimiter is a passive sequence.

10. A dynamic switch for use in a system for transmitting connection defining data in transmissions between a pair of link-level facilities, said connection defining data including at least one of a connect flag, a disconnect flag and a passive flag; said dynamic switch comprising:
   a first port for receiving and sending said transmissions between said link-level facilities; and
   a state machine in said first port being responsive to said connection defining data in said transmissions, said state machine for placing said first port in one of a plurality of defined states, said defined states including:

an inactive state from which said first port may be changed to another defined state responsive to said connection definnig data;

a monolog state to which said first port is changed from said inactive state responsive to a first connect flag from one of said link-level facilities;

a dialog-2 state to which said first port is changed from said monolog state responsive to a second connect flag from the other of said link-level facility; and a dialog-1 state to which said first port is changed either from said monolog state responsive to a passive flag subsequent to said first connect and before said second connect flags or from said dialog-2 state responsive to a disconnect flag from either of said link-level facilities subsequent to said second connect flag.

11. The dynamic switch of claim 10 wherein said connect flag comprises a start of frame sequence, and said disconnect flag comprises an end of frame sequence.

12. The dynamic switch of claim 10 further comprising storage in said first port connected to said state machine for storing the current state of said state machine.

13. The dynamic switch of claim 12 further comprising:

a link connected to said first port for transmitting frames from a link-level facility to said first port, said frames containing said connection defining data; and switch means for connecting said first port to a second port of said dynamic switch.

14. The dynamic switch of claim 13 wherein said monolog state of said state machine is a monolog-S state when a frame is received from its connected link, and said monolog state is a monolog-D state when a frame is received by said first port from said second port via said switch means.

15. The dynamic switch of claim 14 wherein said state machine has a busy state which is a transition state from one of the monolog state or the dialog-1 state to the inactive state responsive to a disconnect flag.

16. The dynamic switch of claim 15 wherein said first port includes an idle character generator for transmitting idle characters on said first port's link when said first port is in one of the busy, inactive or monolog-S states.

17. The dynamic switch of claim 16 wherein said first port transmits on said first port's link, either idle characters or frames received from said second port, when said first port is in the monolog-D, dialog-1 or dialog-2 states.

18. The dynamic switch of claim 17 wherein said first port transmits a frame from its link to said second port via said switch when said first port is in the monolog-S, dialog-1 or dialog-2 states provided said frame is addressed to said second port.

19. In a system for the bi-directional transmission of frames, said system having at least a pair of link-level facilities, each link-level facility attached to a port of a dynamic switch by a link having two conductors for bi-directional transmission, a method for operating said system utilizing frames having flags and destination port addresses, said method comprising:

transmitting a frame having an initiate-connection flag and a destination port address from one of said link-level facilities to its attached port;

determining that said attached port is available by its state stored in said port;

determining that said addressed destination port is available by its state stored in said dynamic switch;

establishing a connection from said attached port to said destination port by said dynamic switch while both ports are available.

responsive to said initiate-connection flag in said frame, changing the state of said attached port to a monolog-S state;

in the monolog-S state, transmitting said frame from the port in the monolog-S state to its connected port via said switch and transmitting idle characters to the port's attached link-level facility;

responsive to said initiate-connection flag in said frame, changing the state of said destination port to a monolog-D state; and in the monolog-D state, transmitting said frame from the port in the monolog-D state to its attached link-level facility.

20. The method of claim 19 further comprising:

transmitting a second frame from one of said connected ports to the other of said connected ports via said dynamic switch;

responsive to the flag in said second frame;

if said one port is in either of said monolog-S or monolog-D states and the flag in said second frame is a passive flag, changing the state of said one port to a dialog-1 state;

if said one port is in either of said monolog-S or said monolog-D states and the flag is an initiate-connect flag, changing the state of said one port to a dialog-2 state; and in either the dialog-1 state or the dialog-2 state, transmitting the second frame to the other port via said dynamic switch and transmitting idle characters from said one port to its attached link-level facility.

21. The method of claim 20 further comprising:

responsive to the flag in said second frame;

if said other port is in either of said monolog-S or monolog-D states and the flag in said second frame is a passive flag, changing the state of said other port to a dialog-1 state;

if said other port is in either of said monolog-S or said monolog-D states and the flag is an initiate-connect flag, changing the state of said other port to a dialog-2 state; and in either the dialog-1 or dialog-2 states, transmitting said second frame to the link-level facility attached to said other port.

22. The method of claim 21 further comprising:

transmitting a new frame from either one of said connected ports to the other of said connected ports via said dynamic switch;

responsive to the flag in said new frame;

if said connected ports are in either the dialog-1 or dialog-2 states and the flag of said new frame is a passive flag, not changing the states of said ports;

if said connected ports are in the dialog-1 states and the flag of said new frame is a disconnect flag, changing the states of the ports to a busy state; or if the connected ports are in the dialog-2 states and the flag of said new frame is a disconnect flag, changing the states of the ports to a dialog-1 state; and in the busy state, transmitting the new frame from the port in the busy state to the other port via said dynamic switch, transmitting an idle character to the attached link-level facility of the port in the busy state, and breaking the connection of said dynamic switch.

23. The method of claim 22 further comprising:
repeatedly sending new frames until the connection of said dynamic switch is broken in accordance with said method.

24. A dynamic connection device comprising:
a plurality of ports;
controller means for establishing a communication path between any two available ports responsive to a first connect request in a frame received at a source port for transmission through said dynamic connection device from said source port to a destination port;
transmission means for transmitting frames between said source port and said destination port over an established communication path established by said controller means; and
path maintaining means for maintaining said established communication path between said source port and said destination port responsive to a second connect request in a frame transmitted from said destination port to said source port by said transmission means, said established communication path being maintained by said path maintaining means subsequent to said second connect request until after both a first disconnect request and a second disconnect request are transmitted in frames by said transmission means.

25. The protocol system of claim 24 wherein one of said first disconnect request and said second disconnect request is in a frame transmitted from said source port to said destination port, and the other of said first disconnect request and said second disconnect request is in a frame transmitted from said destination port to said source port.

* * * * *